US012763367B2

(12) United States Patent
Mettan

(10) Patent No.: US 12,763,367 B2
(45) Date of Patent: Oct. 13, 2026

(54) ELECTROLYTE COMPOSITION FOR AN ANODE-FREE METAL BATTERY CELL

(71) Applicant: Belenos Clean Power Holding AG, Biel/Bienne (CH)

(72) Inventor: Yoann Mettan, Evionnaz (CH)

(73) Assignee: Belenos Clean Power Holding AG, Biel/Bienne (CH)

( * ) Notice: Subject to any disclaimer, the term of this patent is extended or adjusted under 35 U.S.C. 154(b) by 625 days.

(21) Appl. No.: 18/302,040

(22) Filed: Apr. 18, 2023

(65) Prior Publication Data

US 2023/0253628 A1 Aug. 10, 2023

(30) Foreign Application Priority Data

May 10, 2022 (EP) .................................... 22172595

(51) Int. Cl.

*H01M 10/0567* (2010.01)
*H01M 4/38* (2006.01)
*H01M 10/0568* (2010.01)
*H01M 10/0569* (2010.01)
*H01M 4/02* (2006.01)

(52) U.S. Cl.

CPC ....... *H01M 10/0567* (2013.01); *H01M 4/382* (2013.01); *H01M 10/0568* (2013.01); *H01M 10/0569* (2013.01); *H01M 2004/027* (2013.01); *H01M 2300/0037* (2013.01)

(58) Field of Classification Search

CPC ......... H01M 10/0567; H01M 10/0568; H01M 10/0569; H01M 4/382

See application file for complete search history.

(56) References Cited

U.S. PATENT DOCUMENTS

2003/0157412 A1 8/2003 Yamaguchi et al.
2021/0020986 A1 1/2021 Shen et al.
2021/0057723 A1* 2/2021 Gallant ................ H01M 4/136

FOREIGN PATENT DOCUMENTS

CN 111129437 A 5/2020
CN 113394452 A 9/2021
JP 10-241730 A 9/1998
JP 2003-197254 A 7/2003
WO WO-2021213743 A1 * 10/2021 .......... H01M 10/052

OTHER PUBLICATIONS

WO_2021213743 Translation (Year: 2021).*

(Continued)

*Primary Examiner* — Jimmy Vo

(74) *Attorney, Agent, or Firm* — Oblon, McClelland, Maier & Neustadt, L.L.P.

(57) ABSTRACT

An electrolyte composition for an anode-free metal battery cell, wherein the metal is an alkali metal, an alkaline earth metal, or a metal of Group IIIa of the periodic table, including a first solvent, a salt of the alkali metal, the alkaline earth metal or the metal of Group IIIa of the periodic table, the salt being soluble in the first solvent, and an additive. The concentration of the salt in the electrolyte is between 2 M and 3 M, and the additive is a perfluorinated organic compound including at least one halogen atom. The halogen is chlorine, bromine or iodine. An anode-free metal battery cell can include the electrolyte composition.

11 Claims, 1 Drawing Sheet

(56) References Cited

OTHER PUBLICATIONS

Japanese Office Action issued Oct. 7, 2025 in Japanese Patent Application No. 2025-001861, (with unedited computer-generated English translation), 8 pages.
European Search Report issued Oct. 25, 2022 in European Application 22172595.5 filed on May 10, 2022, 2 pages.
Office Action issued Apr. 16, 2024, in corresponding Japanese Patent Application No. 2023-074364 (with English Translation), 8 pages.

* cited by examiner

ELECTROLYTE COMPOSITION FOR AN ANODE-FREE METAL BATTERY CELL

CROSS-REFERENCE TO RELATED APPLICATION

This application claims priority to European Patent Application No. 22172595.5 filed on May 10, 2022, the entire disclosure of which is hereby incorporated herein by reference.

TECHNICAL FIELD OF THE INVENTION

The present invention relates to an electrolyte composition for an anode-free metal battery cell. The invention is further related to anode-free metal battery cells comprising the electrolyte of the invention.

BACKGROUND

Metal batteries based on alkali metals, alkaline earth metals or metals of Group IIIa of the periodic table, such as lithium-metal batteries, magnesium-metal batteries, aluminium-metal batteries and sodium-metal batteries, exist already a while. Examples are lithium-metal secondary batteries. In terms of energy density, cost and safety, the optimization of this battery technology has led to a so-called “anode-free” configuration. In this configuration, the anode consists substantially of only a bare current collector, such as a copper current collector. In other words, the typically used graphite coating on copper current collector is not present.

The charge/discharge mechanisms in an anode-free battery are different from conventional rechargeable batteries due to the absence of an anode in view of the classical idea/composition of an anode. Anode-free battery cells do not contain any excess of electrolyte nor of the alkali metal, the alkaline earth metal or the metal of Group IIIa of the periodic table. However, despite the absence of an anode, an alkali metal, such as lithium or sodium, an alkaline earth metal, such as magnesium, or a metal of Group IIIa of the periodic table, such as aluminium, is required because metal ions will deposit on the anode current collector during charging. This forms a deposited lithium together with an electrochemically stable solid electrolyte interphase (SEI). This deposited lithium is the only lithium available for discharge of the battery cell, i.e. there is no active lithium source at the anode side. This greatly reduces the safety hazard often posed in lithium-metal batteries.

Consequently, consumption of electrolyte and dead alkali metal or alkaline earth metal formation leads to capacity loss and reduced performance of the battery cell. Consequently, an efficiently functioning system requires that all cell components are perfectly adjusted to each other. This is still considered a challenge today.

A key component of any battery cell is the electrolyte. The electrolyte acts as carrier of the ion of the alkali metal or alkaline earth metal. The electrolyte is also the main contact between interfaces.

WO2021213743 discloses an anode-less lithium-ion battery comprising a cathode including a current collector, a current collector as anode, a liquid electrolyte between the current collectors of the anode and the cathode, and a separator. The liquid electrolyte comprises at least one lithium salt and at least 70% by volume of a solvent mixture with respect to the total volume of the electrolyte composition. The solvent mixture comprises at least one fluorinated ether compound and at least one non-fluorinated ether compound. However, although addition of the fluorinated ether compound allows lowering of the overall concentration of the lithium salt, the fluorinated ether compounds are known to offer little or no solubility to the lithium salt. Therefore, the local concentration of the lithium salt in the non-fluorinated ether compound remains high, which leads to undesirable precipitation of the lithium salt in the solvent mixture despite the lower overall concentration of the lithium salt.

Electrolytes known for use in anode-free metal battery cells are so-called high concentration electrolytes (HCE) or super-concentrated electrolyte. Typically, such electrolytes comprise the salt of the metal, i.e. alkali metal salt or alkaline earth metal salt, in a concentration of more than 3 M, often 4 M or more, and even 5.5 M is being used. A known example of such an electrolyte comprises 5.5 M lithium bis(fluorosulfonyl)imide (LiFSI) in dimethyl carbonate (DMC), which is stable with high voltage cathodes and prevents the corrosion of aluminium current collectors. For example, ‘*High rate and stable cycling of lithium metal anode*’, J. Qian, W. A. Henderson, et al., Nature Communications, 6, 6362 (2015) discloses that 4 M LiFSI in DMC can increase the Coulombic efficiency of lithium metal anodes to 99.2%.

The used salts often comprise fluorine. The high concentration of the anion of the salt allows SEI formation with a high content of fluorine on both the anode and the cathode. This reduces, even suppresses, dendrite formation on the metal surface and the battery cells have high plating/stripping (charging/discharging) Coulombic efficiency.

Another electrolyte concept includes localized high concentration electrolytes (LHCE) or localized superconcentrated electrolytes (LSE), which require the use of a diluent to reduce the overall salt concentration in the final electrolyte composition, which however remains higher than 3 M, while maintaining the concentration of salt-solvent clusters formed between the solvent of the electrolyte and the salt upon dissolution of the salt in the solvent. The diluent is inert to the high concentration electrolyte, offering little or no solubility to the salt. Further, the diluent is also readily miscible with the solvating solvent to prevent phase separation. The diluent should also preserve the high-concentration salt-solvent clusters in the formulated electrolyte, i.e., the diluent has poor solvating capacity for $Li^+$ ions to retain the local coordination environment of the HCE, i.e. coordination of the $Li^+$ ions with that of the solvating solvent remains intact. The diluent surrounds the anion of the Li-salt and solvating solvent of the HCE.

WO2020106762 discloses embodiments of localized superconcentrated electrolytes (LSEs) (also referred to as localized high concentration electrolytes (LHCEs)) and devices including such LSEs. The LSEs are used in rechargeable alkali metal and alkali ion batteries, including anode-free battery cells. The electrolyte comprises an active salt, a solvent in which the active salt is soluble, and a diluent in which the active salt is insoluble or poorly soluble. The diluent is a fluorinated orthoformate. The salt is present in the solvent at a concentration of more than 3 M, such as from 3 M to 10 M. The low solubility of the salt in the diluent leads locally to high concentrations of the salt, which causes undesirable precipitation of the salt in the solvent mixture. This phenomenon becomes particularly significant during storage.

One of the disadvantages of such highly concentrated or superconcentrated electrolytes is that the salt must be highly soluble in the solvent. Another disadvantage is that the locally high salt concentrations can cause undesirable precipitation of the salt in the electrolyte. Further, the dissociation constant of the salt must be high in HCE and LHCE. Consequently, several typically used salts cannot be used. A further disadvantage is that the amount of diluent that is added to the electrolyte is rather elevated. Since diluents are often quite expensive, this leads to expensive electrolytes.

SUMMARY OF THE INVENTION

The present invention aims to overcome one or more of the above drawbacks. It is an aim of the invention to provide an electrolyte composition for an anode-free metal battery cell, wherein the electrolyte has a significantly reduced risk of precipitation of the salt. It is a further aim to provide an electrolyte composition wherein a wide range of commercially available salts can be used. It is a further aim to provide an electrolyte which is less expensive compared to known electrolytes.

The present invention further aims to provide an anode-free metal battery cell allowing the formation of a stable SEI, as well as having an increased power density and a better stability against repeated charging/discharging. It is a further aim to provide an anode-free metal battery cell which has an improved life cycle, i.e. which can be charged and discharged more than known anode-free metal battery cells. It is also an aim to provide cheaper anode-free metal battery cells.

In the light of the present invention, the wording “battery” and “battery cell” mean the same.

According to a first aspect of the invention, there is an electrolyte composition for an anode-free metal battery cell as set out in the appended claims. The electrolyte composition comprises a first solvent, an additive, and a metal salt. Optionally, the electrolyte composition can further comprise a second solvent.

The salt of the metal comprises or substantially consists of a salt of an alkali metal, an alkaline earth metal or a metal of Group IIIa of the periodic system. Advantageously, the metal is lithium, magnesium, sodium or aluminium, preferably lithium or magnesium.

The salt of the metal is soluble in the first solvent. Advantageously, when the electrolyte composition comprises a second solvent, the metal salt is soluble in the second solvent as well. The concentration of the salt in the electrolyte is between 0.5 M and 3.25 M, preferably between 1 M and 3.1 M, more preferably between 2 M and 3 M.

Advantageously, the first solvent is selected from the group consisting of alkyl esters of carbonates, ethers, nitriles, sulfones, sulfoxides, esters and ionic liquids. For example, the first solvent can comprise or substantially consist of 1,2-dimethoxyethane (DME).

Ionic liquids are a class of non-molecular compounds that are composed solely of ions, i.e. anions and cations. In the light of the present invention, ionic liquids suitable as the first solvent in the electrolyte composition have advantageously cations that comprise or substantially consist of pyrrolidinium, piperidinium, a cyclic saturated ammonium, or combinations thereof. Advantageously, the anions comprise or substantially consist of bis(fluorosulfonyl)imide (FSI), bis(trifluoromethanesulfonyl)imide (TFSI), or combinations thereof.

The additive is a perfluorinated organic compound comprising at least one further halogen atom. The halogen is chlorine (Cl), bromine (Br) or iodine (I). Advantageously, the additive is soluble in the first solvent. Advantageously, the additive is soluble in the second solvent.

The additive can be a perfluoroalkyl halide according to Formula I $$XCF_2—(CF_2)_x—CF_{3-y}Y_y \quad (I)$$

wherein X is Cl, Br or I; Y is Cl, Br or I; x is between 0 and 10, preferably between 1 and 8, more preferably between 2 and 6; and y is between 0 and 3, preferably 0 or 1.

Advantageously, at least X is I. Advantageously, X and Y are 1. In other words, the perfluoroalkyl halide additive is advantageously a perfluoroalkyl iodide. Examples of suitable perfluoroalkyl iodides are, without being limited thereto, 1-iodoperfluorobutane (i.e. X is I, x is 2 and y is 0; since y is 0 Y can be any one of 1, Cl or Br), 1,4-diiodoperfluorobutane (i.e. X is I, Y is I, x is 2 and y is 1), 1-iodoperfluorohexane (i.e. X is I, x is 4 and y is 0; since y is 0 Y can be any one of 1, Cl or Br), 1,6-diiodoperfluorohexane (i.e. X is I, Y is I, x is 4 and y is 1), or 1,8-diiodoperfluorooctane (i.e. X is I, Y is I, x is 6 and y is 1).

When the first solvent is an ionic liquid, additives according to formula I, in particular perfluoroalkyl iodides, are particularly preferred. Such additives have a high solubility in ionic liquids, i.e. in solutions of high ionic strength.

The additive can be an aromatic compound according to Formula II $$C_6F_{6-q}Z_q \quad (II)$$

wherein Z is Cl, Br, I, or $C_aF_{2a+1-b}Q_b$; Q is Cl, Br, or I; q is between 1 and 5, preferably between 1 and 4, more preferably between 1 and 3; a is between 1 and 10, preferably between 1 and 6, more preferably between 1 and 4; and b is so that 2a+1−b is equal to or higher than 1.

Advantageously, Z is I. Examples of suitable additives according to Formula II are, without being limited thereto, 1,4-diiodo-2,3,5,6-tetrafluorobenzene (i.e. Z is I and q is 2) and 1-iodo-2,3,4,5,6-pentafluorobenzene (i.e. Z is I and q is 1).

Advantageously, the electrolyte composition comprises between 0.01 and 20% by weight of the additive, preferably between 0.05 and 15% by weight, more preferably between 0.1 and 10% by weight, based on the total weight of the electrolyte.

Advantageously, when the electrolyte composition comprises a second solvent, the second solvent acts as a diluent. The second solvent can comprise or substantially consist of a hydrofluoroether, a partially fluorinated alkyl ether, or combinations thereof.

According to a second aspect of the invention, there is provided an anode-free metal battery cell comprising the electrolyte of the invention. Advantageously, the anode-free battery cell is a secondary battery cell.

Advantageously, the metal of the anode-free battery cell is an alkali metal, an alkaline earth metal or a metal of Group IIIa of the periodic system. Preferably, the metal is an alkali metal or an alkaline earth metal. Preferred examples of alkali metals are lithium (Li) (i.e. the anode-free metal battery cell is an anode-free lithium-metal battery cell), sodium (Na) and potassium (K). Preferred examples of alkaline earth metals are magnesium (Mg) (i.e. the anode-free metal battery cell is an anode-free magnesium-metal battery cell) and calcium (Ca). A preferred example of a metal of Group IIIa is aluminium (Al).

Preferably, the metal of the metal salt and the metal of the anode-free battery cell are the same. Advantageously, the metal salt is a lithium salt or a magnesium salt, and the battery cell is an anode-free lithium-metal battery cell or an anode-free magnesium-metal battery cell, respectively.

Advantageously, the anode of the anode-free battery cell comprises a bare current collector. With a bare current collector is meant in the light of the invention a current collector without any layer deposited thereon, such as a graphite layer.

The electrolyte composition of the present invention allows to obtain anode-free metal battery cells wherein a stable SEI formation is obtained. Further, the electrolyte of the invention allows to obtain a higher specific discharge capacity at repeated charging/discharging. In other words, the electrolyte allows to increase the stability of the battery cell under repeated charging/discharging.

The electrolyte composition also has the advantage that a wide range of commercially available metal salts can be used, allowing to obtain battery cells with the required properties for the intended use. The electrolyte also avoids loss of the metal, so-called "dead metal", which increases the lifetime of the battery cell, as well as the power density. This positive effect is further increased by the reduced mobility of the anions in the electrolyte of the invention, which increases the transference number of the metal ion.

The electrolyte further has the advantage that the presence of a second solvent, such as a diluent, is optional, and that when present, low amounts are sufficient. As it is known that diluents are expensive, the electrolyte of the invention is cheaper than the electrolytes known in the art.

DESCRIPTION OF FIGURES

Aspects of the invention will now be described in more detail with reference to the appended drawings, wherein same reference numerals illustrate same features.

DETAILED DESCRIPTION OF THE INVENTION

Figure 1:
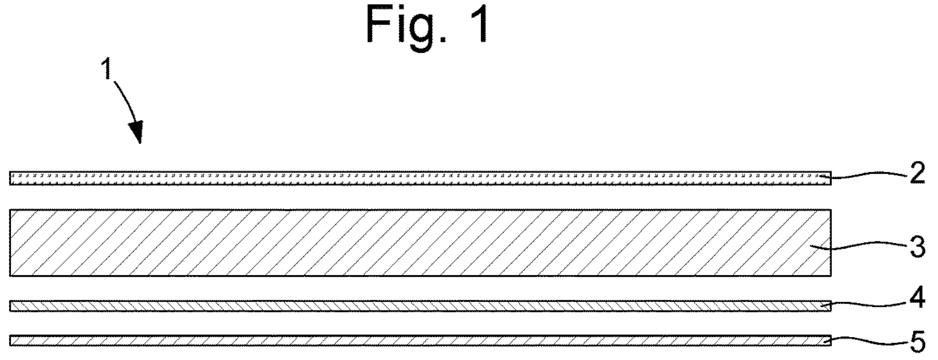
FIG. 1 represents schematically the configuration of an anode-free metal two electrode cell.

The electrolyte composition according to the present invention comprises a first solvent, an additive, and a metal salt.

The metal salt comprises or substantially consists of a salt of an alkali metal, an alkaline earth metal or a metal of Group IIIa of the periodic system. Preferred examples of alkali metals are lithium (Li), sodium (Na) and potassium (K). Preferred examples of alkaline earth metals are magnesium (Mg) and calcium (Ca). A preferred example of a metal of Group IIIa is aluminium (Al). Advantageously, the metal substantially consists of lithium, magnesium, aluminium or sodium, preferably lithium or magnesium.

The electrolyte composition can comprise a combination of two or more metal salts. When two or more metal salts are present, they can comprise the same metal, i.e. all salts are lithium salts, or they can comprise different metals, i.e. a lithium salt and a magnesium salt.

Examples of lithium salts that can be used in the electrolyte composition of the invention include, without being limited thereto, lithium hexafluorophosphate ($LiPF_6$), lithium perchlorate ($LiClO_4$), lithium hexafluoroarsenate ($LiAsF_6$), lithium tetrafluoroborate ($LiBF_4$), lithiumbis(oxalato)borate (LiBOB), lithium difluoro(oxalato)borate (LiDFOB), lithium trifluoromethanesulfonate (LiTf), lithium bis(trifluoromethanesulfonyl) imide (LiTFSI), lithium bis(fluorosulfonyl)imide (LiFSI) and their derivates.

Advantageously, derivates of LiFSI and LiTFSI include, without being limited thereto, lithium bis(R-sulfonyl) imide and lithium ($R^1$,$R^2$-sulfonyl) imide salts wherein R, $R^1$ $R^2$ are at least partially fluorinated alkyl groups. For example, $R^1$ and $R^2$ can be independently of each other fluor, trifluoromethyl, pentafluoroethyl, nonafluorobutyl. Examples of such derivates include lithium (fluorosulfonyl)(trifluoromethanesulfonyl) imide and lithium (pentafluoroethanesulfonyl)(trifluoromethanesulfonyl) imide.

Examples of magnesium salts include, without being limited thereto, magnesium perchlorate ($Mg(ClO_4)_2$), magnesium bis(trifluoromethanesulfonimide) ($Mg(TFSI)_2$), and magnesium (fluoroalkoxy) borates of formula $Mg((R^3R^4R^5R^6)B)_2$, wherein $R^3$, $R^4$, $R^5$ and $R^6$ are at least partially fluorinated alkoxy groups. Two or more of $R^3$ to $R^6$ can be the same, or $R^3$ to $R^6$ can be different from each other. One or more of $R^3$ to $R^6$ can be fully fluorinated. In particular, $R^3$ to $R^6$ can be mono-dentate ligands or bi-dentate ligands. An example of such a magnesium salt is

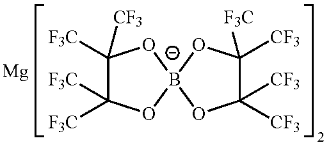

Examples of sodium salts include, without being limited thereto, sodium perchlorate ($NaClO_4$), sodium hexafluorophosphate ($NaPF_6$), sodium hexafluoroarsenate ($NaAsF_6$), sodium tetrafluoroborate ($NaBF_4$), sodium trifluoromethanesulfonate (NaTf), sodium bis(trifluoromethanesulfon) imide (NaTFSI), and sodium bis(fluorosulfonyl)imide (NaFSI).

Advantageously, derivates of NaFSI and NaTFSI include, without being limited thereto, sodium bis(R-sulfonyl) imide and sodium ($R^1$,$R^2$-sulfonyl) imide salts wherein R, $R^1$ $R^2$ are at least partially fluorinated alkyl groups. For example, $R^1$ and $R^2$ can be independently of each other fluor, trifluoromethyl, pentafluoroethyl, nonafluorobutyl. Examples of such derivates include sodium (fluorosulfonyl)(trifluoromethanesulfonyl) imide and sodium (pentafluoroethanesulfonyl)(trifluoromethanesulfonyl) imide.

The salt of the metal is soluble in the first solvent. The concentration of the salt in the electrolyte is between 0.5 M and 3.25 M, for example between 1 M and 3.1 M, preferably between 1.5 M and 3.05 M, more preferably between 2 M and 3 M.

The inventors have found that at these moderate salt concentrations it is no longer required that the metal salt has a high solubility and a high dissociation constant in the first solvent. Consequently, a wide range of commercially available metal salts can be used in the electrolyte composition of the invention.

The inventors have further surprisingly discovered that at such moderate salt concentrations it is possible to obtain the formation of a stable SEI layer with a moderately high concentration of fluorine ions, without compromising the solubility of the metal salt in the solvent. As it is known in the field, the presence of fluorine ions in the SEI tends to suppress the overall metal loss as the quantity of dead metal (i.e. detached, electrically isolated metal) formed is reduced largely. This prevents electrolyte decomposition. Consequently, efficiency loss is reduced, even inhibited, and the Coulombic efficiency may even be improved. Hence, the presence of fluorine ions in the SEI layer contributes to a better performance of the battery cell.

The electrolyte compositions of the invention further comprise a first solvent. Advantageously, the electrolyte comprises between 2% by weight and 40% by weight of the first solvent, preferably between 5% by weight and 30% by weight, more preferably between 7% by weight and 20% by weight, such as between 10% by weight and 15% by weight, based on the total weight of the electrolyte composition.

The first solvent can comprise or substantially consist of an organic solvent, such as an alkyl ester of a carbonate, an ether, a nitrile, a sulfone, a sulfoxide, an ester, or combinations of any two or more thereof.

Examples of organic solvents include, without being limited thereto, 1,2-dimethoxyethane (DME), dimethyl carbonate, ethylene carbonate, ethylmethyl carbonate, dimethyl ether, dimethoxyethane, tetrahydrofurane, dioxane, 1,3-dioxolane, tetraethylene glykol dimethyl ether, acetonitrile, succinonitrile, adiponitrile, sulfolane, dimethylsulfoxide, methyl acetate, and methyl propionate.

Alternatively and/or additionally, the first solvent can comprise or substantially consist of an ionic liquid. Ionic liquids are a class of non-molecular compounds that are composed solely of ions, i.e. anions and cations. They are known to have a negligible vapour pressure at room temperature as well as a high thermal stability, which makes them suitable as replacement or in addition to traditional (organic) solvents.

In the light of the present invention, ionic liquids suitable as the first solvent in the electrolyte composition have advantageously cations that comprise or substantially consist of pyrrolidinium, piperidinium, imidazolium, ammonium, such as a cyclic saturated ammonium, or combinations thereof. The cyclic saturated ammonium can be according to formula III:

(III)

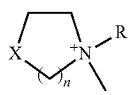

wherein X is $CH_2$ or O, and n is between 1 and 3.

In the light of the present invention, ionic liquids suitable as the first solvent in the electrolyte composition have advantageously anions that comprise or substantially consist of bis(fluorosulfonyl) imide (FSI), bis(trifluoromethanesulfonyl) imide (TFSI), hexafluorophosphate, dicyanamide, tetrachloroaluminate, or combinations thereof. Preferred examples of anions are bis(fluorosulfonyl) imide (FSI) and bis(trifluoromethanesulfonyl) imide (TFSI).

The additive of the electrolyte composition of the invention is a perfluorinated organic compound comprising at least one further halogen atom. Advantageously, the halogen is chlorine (Cl), bromine (Br) or iodine (I). Advantageously, the additive is soluble in the first solvent.

The inventors have discovered that by using a perfluorinated organic compound in the electrolyte composition, the halogen atom(s) of this compound bind(s) with the anion of the metal salt. It was noticed that the halogen bonding interactions between the anion of the salt and the halogen atom(s) of the additive are strong enough to break up the interaction between the anion and the cation of the metal salt. Hence, such halogen bonding allows the metal ions of the metal salt to move freely. Further, the halogen bonding between the halide and the anion reduces the mobility of the anion. As a result, the transference number of the ions of the alkali metal or alkaline earth metal in the electrolyte advantageously increases.

The transference number is defined as the ratio of the electric current derived from the cation, here the cation of the alkali metal or alkaline earth metal, to the total electric current. It is known that a large transference number can reduce concentration polarization of electrolytes during charge-discharge steps, and can thus produce higher power density.

Consequently, the use of a perfluorinated organic compound as additive in the electrolyte composition according to the present invention allows to obtain a battery cell with an increased power density compared to battery cells without the additive. The inventors also noticed that any parasitic reactions with the battery are reduced by using an additive of the invention. This reduction increases the cell lifetime.

The halogen bond is the strongest when the halogen is iodine (I), followed by bromine (Br) and chlorine (Cl). Hence, the halogen is advantageously iodine (I).

The additive can be a perfluoroalkyl halide according to Formula I $$XCF_2—(CF_2)_x—CF_{3-y}Y_y \quad \text{(I)}$$

wherein X is Cl, Br or I; Y is Cl, Br or I; x is between 0 and 10, preferably between 1 and 8, more preferably between 2 and 6; and y is between 0 and 3, preferably 0 or 1.

The perfluoroalkyl halide according to Formula I can be linear or branched.

Advantageously, at least X is I. Advantageously, X and Y are I. In other words, the perfluoroalkyl halide additive is advantageously a perfluoroalkyl iodide. Examples of suitable perfluoroalkyl iodides are, without being limited thereto, 1-iodoperfluorobutane (i.e. X is I, x is 2 and y is 0; since y is 0 Y can be any one of I, Cl or Br), 1,4-diiodoperfluorobutane (i.e. X is I, Y is I, x is 2 and y is 1), 1-iodoperfluorohexane (i.e. X is I, x is 4 and y is 0; since y is 0 Y can be any one of I, Cl or Br), 1,6-diiodoperfluorohexane (i.e. X is I, Y is I, x is 4 and y is 1), or 1,8-diiodoperfluorooctane (i.e. X is I, Y is I, x is 6 and y is 1).

Alternatively, X and Y can be Cl, i.e. the additive is advantageously a perfluoroalkyl chloride. Examples of suitable perfluoroalkyl chlorides are, without being limited thereto, 1-chloroperfluorobutane (i.e. X is Cl, x is 2 and y is 0; since y is 0 Y can be any one of I, Cl or Br), 1,4-dichloroperfluorobutane (i.e. X is Cl, Y is I, x is 2 and y is 1), and 1,6-dichloroperfluorohexane (i.e. X is Cl, Y is I, x is 4 and y is 1).

Alternatively, X and Y can be Br, i.e. the additive is advantageously a perfluoroalkyl bromide. Examples of suitable perfluoroalkyl bromides are, without being limited thereto, 1-bromoperfluorobutane (i.e. X is Br, x is 2 and y is 0; since y is 0 Y can be any one of I, Cl or Br), 1,4-dibromoperfluorobutane (i.e. X is Br, Y is I, x is 2 and y is 1), and 1,6-dibromoperfluorohexane (i.e. X is Br, Y is I, x is 4 and y is 1).

Additives according to Formula I, and in particular perfluoroalkyl iodides as described above, are particularly preferred when the first solvent is an ionic liquid. It is known that such molecules have a high solubility in ionic liquids, i.e. in solutions of high ionic strength.

The additive can be an aromatic compound according to Formula II $$C_6F_{6-q}Z_q \quad \text{(II)}$$

wherein Z is Cl, Br, I, or $C_aF_{2a+1-b}Q_b$; Q is Cl, Br, or I; q is between 1 and 5, preferably between 1 and 4, more preferably between 1 and 3; a is between 1 and 10, preferably between 1 and 8, such as between 1 and 6, more preferably between 1 and 4; and b is selected so that 2a+1-b is equal to or higher than 1.

Advantageously, Z is I. Examples of suitable additives according to Formula II are, without being limited thereto, 1,4-diiodo-2,3,5,6-tetrafluorobenzene (i.e. Z is I and q is 2) and 1-iodo-2,3,4,5,6-pentafluorobenzene (i.e. Z is I and q is 1).

Alternatively, Z is $C_aF_{2a+1-b}Q_b$. When Z is $C_aF_{2a+1-b}Q_b$, it can be linear or branched (branched is possible only when C is 3 or higher). For example, the additive can be 1-[difluoro(iodo)methyl]-2,3,4,5,6-pentafluorobenzene (i.e. Q is I, q is 1, a is 1, b is 1, so that Z is $CF_2I$).

Advantageously, the electrolyte composition comprises between 0.01 and 20% by weight of the additive, preferably between 0.05 and 15% by weight, more preferably between 0.1 and 10% by weight, based on the total weight of the electrolyte.

Optionally, the electrolyte composition further comprises a second solvent. Advantageously, the second solvent acts as a diluent. Advantageously, the additive is soluble in the second solvent. Advantageously, the metal salt is soluble in the second solvent.

Advantageously, when the electrolyte comprises a second solvent, it comprises between 2% by weight and 40% by weight of the second solvent, preferably between 5% by weight and 30% by weight, more preferably between 7% by weight and 20% by weight, such as between 10 % by weight and 15% by weight, based on the total weight of the electrolyte composition.

The second solvent can comprise or substantially consists of a hydrofluoroether, a partially fluorinated alkyl ether, or combinations thereof. For example, the solvent can comprise one or more hydrofluoroethers and/or one or more partially fluorinated alkyl ethers. Examples of the second solvent include, without being limited thereto, bis(2,2,2-trifluoroethyl)ether (BTFE) and 1,1,2,2-tetrafluoroethyl-2,2,3,3-tetrafluoropropyl ether (TTE).

The inventors have surprisingly discovered that when the electrolyte composition comprises an additive according to the invention, the amount of the second solvent, if any, can be lower than for electrolytes of the art. Consequently, since these solvents are amongst the most expensive compounds in an electrolyte, the electrolyte of the invention and the battery cells comprising the electrolyte, can be less expensive.

According to a second aspect of the invention, there is provided an anode-free metal battery cell comprising the electrolyte of the invention. Advantageously, the anode-free battery cell is a secondary battery cell.

FIG. 1 represents an exemplary embodiment of anode-free metal battery cell 1. The cell 1 can have a stacked configuration. The battery cell 1 comprises an anode 5 and a cathode 2. The battery cell 1 further comprises an electrolyte composition 3 according to the invention.

Advantageously, the cathode 2 comprises an alkali metal, an alkaline earth metal or a metal of Group IIIa of the periodic system. Preferred examples of alkali metals are lithium (Li) (i.e. the metal battery cell is a lithium-metal battery cell), sodium (Na) and potassium (K). Preferred examples of alkaline earth metals are magnesium (Mg) (i.e. the battery cell is a magnesium-metal battery cell) and calcium (Ca). A preferred example of a metal of Group IIIa is aluminium (Al). Preferably, the metal is an alkali metal or an alkaline earth metal. Advantageously, the metal is lithium, magnesium, aluminium or sodium. Examples of suitable cathode compositions include lithium iron phosphate ($LiFePO_4$, often abbreviated as LFP), lithium nickel manganese cobalt oxides (abbreviated as NMC, for example NMC types NMC622 and NMC811), high-voltage spinel lithium manganese nickel oxide ($LiNi_{0.5}Mn_{1.5}O_4$, often abbreviated as LNMO), and lithium manganese iron phosphate ($LiMnFePO_4$).

Advantageously, the anode 5 comprises a bare current collector. With a bare current collector is meant in the light of the invention a current collector without any layer deposited thereon, such as a graphite layer. The current collector can comprise or substantially consist of one or more of copper, nickel, nickel plated copper, titanium, stainless steel.

The stacked type battery cell 1 can optionally comprise a battery separator membrane 4 between the anode 5 and the cathode 2. The battery separator membrane can comprise at least one layer of a porous separator membrane. For example, the battery separator membrane can be a single layer membrane or can comprise two or more, e.g. three, layers attached to each other. Each layer of the battery separator membrane can comprise or substantially consist of known materials, polypropylene (PP), polyethylene (PE), an aromatic polyamide (aramide), or fluorinated compounds such as polyvinylidenefluoride (PVDF) or polytetrafluoroethylene (PTFE), which can be optionally ceramic loaded. For example, the battery separator can comprise a PE layer sandwiched between two layers of ceramic loaded PVDF. Advantageously, at least one of the materials of the separator is chemically inert. However, chemically inert materials are often not easily wetted, while it is preferred that the porous separator may absorb the liquid electrolyte. To this end the membrane material may be treated with a surface treatment or a coating, such as a spray coating, a dip coating or a plasma coating—atmospheric pressure plasma or low pressure plasma. Alternatively, the battery separator membrane may be a ceramic material.

Preferably, the metal of the metal salt and the metal of the anode-free battery cell are the same. Advantageously, the metal salt is a lithium salt, a magnesium salt, an aluminium salt or a sodium salt, and the battery cell is an anode-free lithium-metal battery cell, an anode-free magnesium-metal battery cell, an anode-free aluminium-metal battery cell, or an anode-free sodium-metal battery cell, respectively.

Examples

Anode-free battery cells were made to evaluate the charge/discharge characteristics and the cycle life characteristics of anode-free lithium-metal battery cells. The two electrode cells were produced in a dry room with a dew point of −60° C. to reduce the risk for contamination during production.

Two electrode cells according to FIG. 1 were made, in which the electrolyte was according to the invention and the composition of which was 8.00 g LiFSI (lithium salt), 6.00 g DME (first solvent), 6.00 g 1,1,2,2-tetrafluoroethyl-2,2,3,3-tetrafluoropropyl ether (second solvent), and 0.14 g of the additive 1,4-diiodoperfluorobutane.

A reference battery cell was made as well, in which the electrolyte composition was 8.00 g LiFSI (lithium salt), 6.00 g DME (first solvent) and 6.00 g 1,1,2,2-tetrafluoroethyl-2,2,3,3-tetrafluoropropyl ether (second solvent). No perfluorinated compound comprising at least one halogen atom was added as additive.

For both battery cells, the cathode was a LFP cathode, the anode was a 15 μm thick copper foil as bare current collector, and the battery separator was an three-layer membrane comprising a PE layer sandwiched between two ceramic loaded PVDF layers. Both battery cells comprised 60 μl of the electrolyte. The battery cells were vacuum sealed.

The obtained thin-film battery cell according to the invention and the reference thin film battery cell were subjected to first a sequence of charging-discharging-charging, followed by repeated charging/discharging cycles at 25° C. The first charge of the sequence charged the battery cells at 1 mA to 3.6 V (0.13 $mA/cm^2$). The discharge of the sequence discharged the battery cells at 7.56 mA to 2.8 V (1 $mA/cm^2$). The second charge of the sequence charged the battery cells at 1.52 mA to 3.6V (0.2 $mA/cm^2$).

Figure 2:
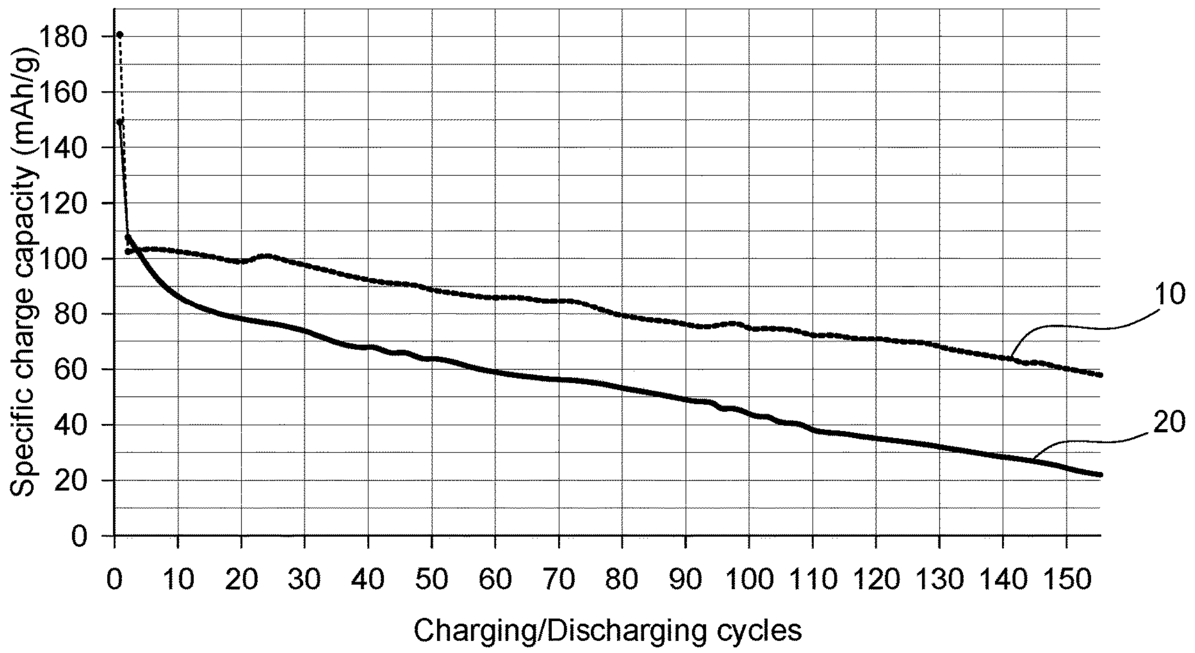
FIG. 2 represents the specific capacity of two electrode cells according to FIG. 1, wherein the electrolyte comprises no additive (reference battery cell) and a perfluoroalkyl iodide additive (inventive battery cell), respectively.

The specific discharge capacity was measured for each charge/discharge cycle and the results are shown in FIG. 2. FIG. 2 shows the specific discharge capacity results as function of the number of charge/discharge cycles, up to 155 cycles, for the battery cell according to the invention (10) and the reference battery cell (20). It is clear from FIG. 2 that the specific discharge capacity of the battery cell according to the invention (10) is at any time at least equal to and mostly higher than the capacity of the reference battery cell (20).

NOMENCLATURE

1. Battery cell
2. Anode
3. Cathode
4. Electrolyte
5. Battery separator
10. Profile for battery cell with inventive electrolyte composition
20. Profile for battery cell with reference electrolyte composition

The invention claimed is:

1. An electrolyte composition for an anode-free metal battery cell, comprising:

a first solvent, selected from the group consisting of alkyl esters of carbonates, ethers, nitriles, sulfones, sulfoxides, esters and ionic liquids;

optionally, a second solvent selected from the group consisting of a hydrofluoroether, a partially fluorinated alkyl ether and a combination thereof:

a salt of an alkali metal, an alkaline earth metal or a metal of Group IIIa of the periodic table, wherein the salt is soluble in the first solvent, and a perfluorinated organic compound of Formula I $$XCF_2—(CF_2)_x—CF_{3-y}Y_y \quad (I)$$

wherein

X is Cl, Br or I,

Y is Cl, Br or I, x is between 0 and 10, and y is between 1 and 3, wherein the concentration of the salt in the electrolyte is between 2 M and 3 M, the metal of the anode-free metal battery cell is an alkali metal, an alkaline earth metal or a metal of Group IIIa of the periodic table, and when the second solvent is present, the % by weight of the second solvent is from 2% by weight to 30% by weight of the electrolyte composition.

2. The electrolyte composition according to claim 1, wherein the metal is lithium (Li) or magnesium (Mg), the salt is a lithium salt or magnesium salt, respectively, and the battery cell is a lithium-metal battery cell or a magnesium-metal battery cell, respectively.

3. The electrolyte composition according to claim 1, wherein X and Y are each I.

4. The electrolyte composition according to claim 3, wherein the perfluorinated organic compound is selected from the group consisting of 1,4-diiodoperfluorobutane, 1,6-diiodoperfluorohexane, and 1,8-diiodoperfluorooctane.

5. The electrolyte composition according to claim 1, comprising between 0.01 and 20% by weight of the perfluorinated organic compound of Formula I, based on the total weight of the electrolyte.

6. The electrolyte composition according to claim 1, wherein the first solvent is an ionic liquid and wherein the ionic liquid comprises a cation and an anion, wherein the cation comprises pyrrolidinium, piperidinium, imidazolium, a cyclic saturated ammonium, or combinations thereof, and the anion comprises bis(fluorosulfonyl)imide (FSI), bis(trifluoromethanesulfonyl)imide (TFSI), or combinations thereof.

7. The electrolyte composition according to claim 1, comprising the second solvent.

8. An anode-free metal battery cell, comprising the electrolyte according to claim 1, wherein the metal of the anode free metal battery is an alkali metal, an alkaline earth metal or a metal of Group IIIa of the periodic table.

9. The anode-free metal battery cell according to claim 8, wherein the battery cell is a lithium-metal battery cell or a magnesium-metal battery cell.

10. The anode-free metal battery cell according to claim 8, wherein the battery cell is a secondary battery cell.

11. The anode-free metal battery cell according to claim 8, wherein the anode comprises a bare current collector.

* * * * *